United States Patent [19]
Domnick

[11] 3,841,484
[45] Oct. 15, 1974

[54] FLUID FILTER WITH COLOR INDICATOR
[75] Inventor: Keith Raphael Domnick, East Boldon, England
[73] Assignee: Domnick Hunter (Engineers) Limited, Birtley, England
[22] Filed: Apr. 2, 1973
[21] Appl. No.: 346,773

Related U.S. Application Data
[63] Continuation-in-part of Ser. No. 120,471, March 3, 1971, abandoned.

[52] U.S. Cl.................... 210/95, 55/274, 210/266, 210/282
[51] Int. Cl............................................ B01d 35/02
[58] Field of Search.......... 55/274, 316; 210/25, 39, 210/40, 85, 94, 266, 282, 95

[56] References Cited
UNITED STATES PATENTS

| | | | |
|---|---|---|---|
| 2,325,657 | 8/1943 | Burkness............................ | 210/94 |
| 2,641,535 | 6/1953 | Dunn et al........................ | 210/25 X |
| 3,254,771 | 6/1966 | Sicard............................. | 210/282 X |
| 3,261,473 | 7/1966 | Riede.............................. | 210/282 |
| 3,327,859 | 6/1967 | Pall................................ | 210/266 |
| 3,355,018 | 11/1967 | Smith............................. | 210/94 |
| 3,595,399 | 7/1971 | Abos et al....................... | 210/282 X |
| 3,620,677 | 11/1971 | Morison.......................... | 55/27 AX |

Primary Examiner—Samih N. Zaharna
Assistant Examiner—Robert H. Spitzer
Attorney, Agent, or Firm—Steinberg & Blake

[57] ABSTRACT

A fluid filter for indicating by color the presence of an excessive amount of a given substance. A housing is formed at opposed end regions with a fluid inlet and a fluid outlet, and this housing has in its interior a microfibre cylinder which is hollow and which is spaced from the side wall of the housing between the fluid inlet and fluid outlet to define a passage with the housing. The fluid which enters through the inlet must first flow to the interior of the cylinder before reaching the passage between the latter and the housing. Packed within the fibre cylinder between the interior thereof and the inlet is an adsorbent medium having distributed therein dye particles soluble in the substance which is detected so that when the latter substance is present in an excessive amount in the fluid the dye particles dissolve to release a coloring medium which contrasts with the color of the micro-fibre cylinder so as to discolor the latter. The housing is constructed in such a way that it is possible to see the cylinder through the wall of the housing, and in this way an indication will be given of the presence of the undesirable substance in the fluid.

15 Claims, 2 Drawing Figures

FLUID FILTER WITH COLOR INDICATOR

CROSS REFERENCE TO RELATED APPLICATION

This application is a continuation-in-part of copending application Ser. No. 120,471, which was filed Mar. 3, 1971 and entitled "IMPROVED FILTER CARTRIDGE FOR FLUIDS" now abandoned.

BACKGROUND OF THE INVENTION

The present invention relates to fluid filters.

In particular, the present invention relates to filter cartridges capable of indicating the presence of an undesirable substance in the filtered fluid.

In particular, the present invention relates to a filter cartridge which is designed to give a visible warning of the presence of an excessive amount of oil within the fluid which is filtered.

At the present time there are many different types of filter cartridges designed to filter fluids such as liquids which flow along a given circuit. Such circuits will normally have components which are lubricated with oil. During normal operation of many different types of machinery which include circuits of this type, a certain minimal amount of the lubricating oil may become located in the liquid which is circulated and which is filtered by the conventional filter cartridges. When there is an occurrence of a failure of an oil seal, for example, an excessive amount of oil will become located in the circulated fluid, and at the present time such a condition can go on for an undesirably long period without being detected. For example, if a sealing element such as an O-ring should burst or fail for any other reason, an undesirable amount of lubricating oil will become located in a circulated liquid, but the moving parts which are lubricated can continue to operate undesirably for a considerable period of time before such an occurrence will be detected. The result is not only undesirable contamination of the circulated fluid, but also lack of proper lubrication of the moving components so that the machinery can become undesirably damaged if there is no early detection of the failure of a seal which releases an excessive amount of oil into a circulating fluid.

SUMMARY OF THE INVENTION

It is accordingly a primary object of the present invention to provide a filter cartridge which will give a warning of an occurrence of the above type.

Thus, it is a particular object of the present invention to provide a filter cartridge which is capable of giving an indication that an excessive amount of a substance such as oil is located in a fluid which is filtered.

It is particularly an object of the present invention to provide a visual warning of an excessive amount of oil in a circulating fluid, in a highly reliable manner.

In addition it is an object of the invention to provide a construction of this type which is relatively simple and inexpensive, which can be easily mounted on machinery having a circulating fluid which may contain an undesirably large amount of oil, and which is capable of providing in a highly convenient manner a visible warning of the presence of excessive oil in the circulating fluid.

According to the invention the fluid-filtering device includes a filter cartridge having a housing means which has opposed end regions and which is formed with a fluid inlet at one of these end regions and a fluid outlet spaced from the fluid inlet and situated at the other of the end regions. A micro-fibre cylinder means is supported within the housing means for separating the fluid outlet from the fluid inlet. This micro-fibre cylinder means has a hollow interior communicating with the inlet. The housing means has a side wall spaced from and surrounding the exterior side surface of the cylinder means to define therewith a passage through which the fluid flows after passing from the inlet to the interior of the cylinder means and through the wall thereof to the passage before reaching the fluid outlet. The housing means coacts with the cylinder means to render the latter visible through the housing means. An adsorbent filter medium is packed within the cylinder means. A diffuser means is disposed between the fluid inlet and the adsorbent medium for distributing fluid entering through the fluid inlet to the filter medium packed within the cylinder means. An oil-soluble dye means is distributed within the adsorbent medium for responding to the presence of oil in the fluid which enters through the inlet to release a dye having a color which contrasts with the color of the cylinder means. This dye is carried with the fluid through the cylinder means before reaching the above passage so that the cylinder means will coact with the dye which is released by the dye means when oil is present in an excessive amount in the fluid to be discolored by the dye so that the discolored cylinder may then be seen through the housing means to indicate that oil is present in an excessive amount in the fluid.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
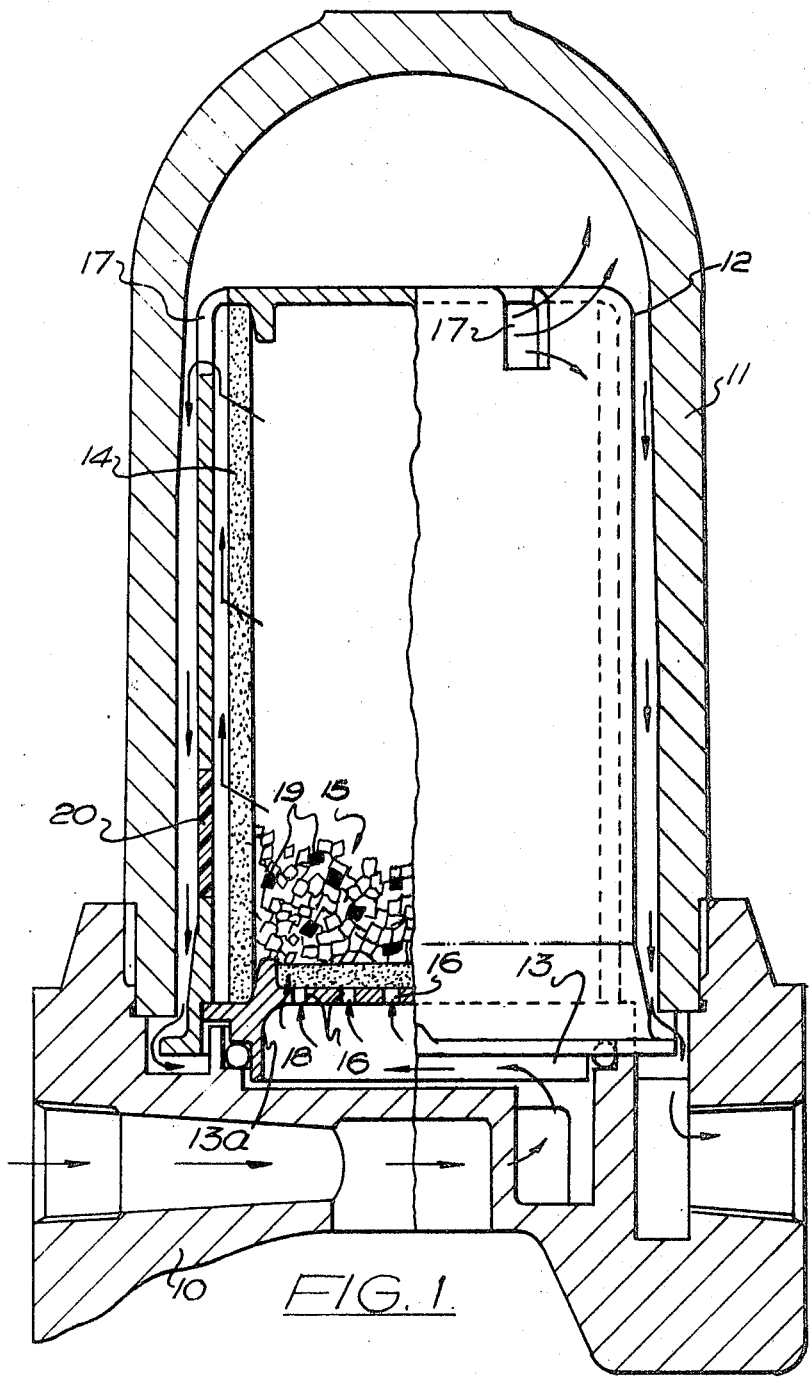
FIG. 1 is a partly schematic sectional elevation of one embodiment of the invention.

Referring to FIG. 1, there is illustrated therein a filter device for fluids including a fluid inlet and outlet manifold 10, a cover 11 removably mounted thereon, and a filter cartridge 12 which is constructed in accordance with the present invention.

The filter cartridge 12 includes a transparent housing means 13, a micro-fibre cylinder means 14 supported therein, and an adsorbent filter medium 15 packed within the cylinder 14. Housing means 13 has a plurality of fluid inlet apertures 16 forming an inlet in its end wall 13a adjacent an inlet port of the manifold, the inlet apertures communicating with the interior of cylinder 14 and the adsorbent filter medium 15 packed therein. Housing means 13 also has a plurality of fluid outlet apertures 17 at its opposed end region and forming an outlet situated outwardly of the cylinder 14 which is therefore disposed between the inlet apertures 16 and outlet apertures 17. A diffuser means 18 of porous plastic material such as polyurethane is disposed between the inlet apertures and the adsorbent medium. an oil-soluble dye means is formed by a plurality of capsules 19 inserted at the inlet of the cylinder adjacent the diffuser 18 and against the adsorbent medium.

The arrows shown in the figure illustrate the path of a fluid passing through the filter device; after leaving the inlet port of manifold 10 the fluid enters the filter cartridge 12 through the inlet apertures 16, passes through the diffuser 18, the adsorbent filter medium 15 and the micro-fibre cylinder 14, and finally leaves the cartridge through the outlet apertures 17. In the filter device shown, the filtered fluid is then directed by the cover 11 to an outlet port of manifold 10.

In the event of oil being entrained in the fluid, the oil-soluble dye capsules 19 will dissolve to release the dye which will be carried by the fluid flow towards the cylinder 14 which will become increasingly discolored by the dye, thereby giving a visible indication of the presence of oil.

Thus, according to the present invention, with the embodiment of FIG. 1 a filter cartridge for use in the filtration of fluids comprises a transparent housing having at least one fluid inlet aperture and at least one fluid outlet aperture, a micro-fibre cylinder supported within said housing and separating the or each fluid outlet aperture from the or each fluid inlet aperture, an adsorbent filter medium packed within the cylinder, a diffuser of porous plastics material disposed between the or each fluid inlet aperture and the adsorbent medium, and a plurality of oil-soluble dye capsules distributed within the adsorbent medium.

In the embodiment of FIG. 1, the housing consists of a transparent plastic material and has a plurality of inlet apertures in one of its end walls, and a plurality of outlet apertures through its side wall adjacent its opposed end wall. The cylinder, which may be white and which preferably consists of ultra fine glass micro-fibres (about one micron) strengthened with a small addition of epoxy or phenolic resin to form a reinforced borosilicate micro-fibre tube, extends between the end walls of the housing so that the filtered fluid must pass therethrough before reaching the outlet apertures. The adsorbent filter medium is preferably activated carbon granules or chips, but other suitable adsorbents include activated alumina, silica gel and various types of molecular sieve, while the diffuser may be polyurethane.

Figure 2:
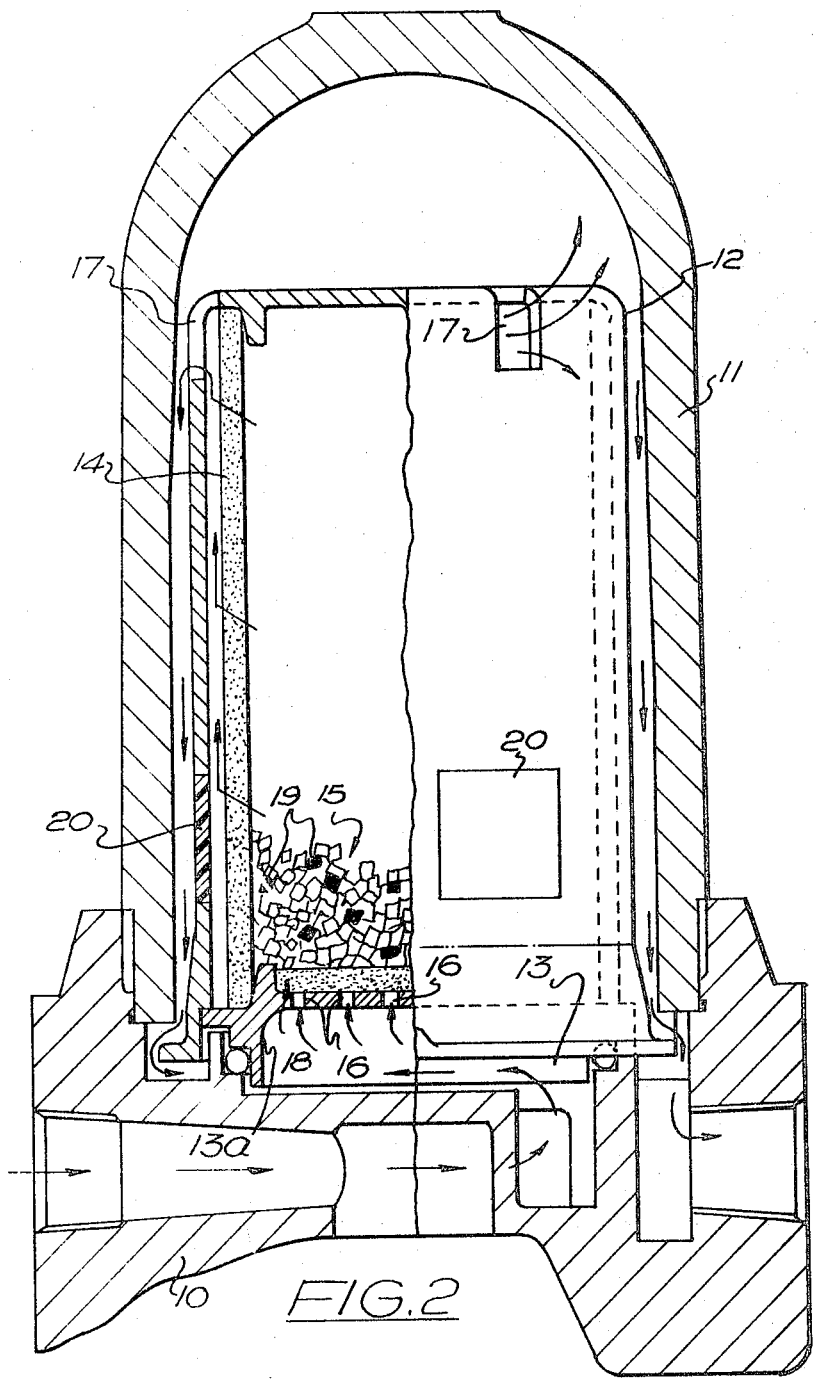
FIG. 2 is a fragmentary sectional elevation illustrating a different embodiment of the structure of FIG. 1.

It is not essential, however, that the housing 13 be made of a transparent material. It is only required that the housing 13 have a construction which will render the cylinder 14 visible. Thus, as is shown in FIG. 2, it is possible for the housing 13 to be made of an opaque material while openings in the housing may be closed by way of transparent windows 20 situated at the lower region of the housing 13 so that through these transparent windows 20 it is also possible to see at least the lower portion of the cylinder 14. Thus, in this case the housing 13 may be made of metal while the windows 20 can be made of any transparent plastic or glass.

Thus, the windows 20 need only be located at the lower region of the housing since it is at the lower portion of the cylinder 14 adjacent the dye capsules that the major part of the released dye is carried through the cylinder 14. In any event, any dye carried through the cylinder at a higher level will tend to drop down the outside of the cylinder as a result of the action of gravity, together with oil passing through the cylinder, after there is a flush of excessive oil due to some breakdown. During normal use any coalesced oil haze drops down the outside of the cylinder and thus the windows at the lower portion of the housing are also of value in providing a view of any build-up of oil after prolonged use, although in this case there will be no dye present on the outside of the cylinder.

Thus, it is important to the present invention that the dye capsules are provided in order to give a visual indication of the presence of oil resulting from a breakdown, for example in an O-ring seal, which lets through to the filter a sudden rush of oil. Thus, a build-up of oil during normal trouble-free operation will not affect the dye capsules. The cylinder 14 is operative during normal operation to coalesce any oil haze when the filter is employed with air, and this may be any residual oil hayze from a companion filter. Thus, during such normal use there will be no visual indication of the color released by the dye capsules, but if there is a sudden rush of oil in the liquid there will still be a visual effect resulting from the release of the dye.

With respect to the micro-fibre cylinder means 14, this cylinder preferably has 90 percent void volume, or in other words 10 percent of the filter cylinder 14 is composed of the fibres while 90 percent thereof is free passage space, and the cylinder itself is not particularly absorbent. Therefore both the dye and the oil will go through the cylinder together. As a result the particular thickness of the cylinder is not critical but from practical experience it has been found that certain thicknesses of the cylinder wall are suitable for certain diameters of the cylinder. For a filter cylinder 14 which has an outside diameter of 3 inches the cylinder's thickness should not be more than 1.5 cm. This will increase to a thickness of 2 cm. for a 4 inch outside diameter cylinder, while a cylinder having a 6 inch outside diameter will not have a thickness which is greater than 3 cm.

The oil-soluble dye capsules may be in the form of chips or granules and may consist of a mixture of oil-soluble wax and a dyestuff, preferably or a readily identifiable color contrasting with that of the cylinder. In a particular example the dyestuff is WAXOLINE RED O.S. dyestuff manufactured by I.C.I. Alternatively the dyestuff may be encapsulated with a shell of oil-soluble wax.

In the event that oil becomes entrained in the fluid being filtered (which may be a gas or a liquid) the oil-soluble wax will dissolve and the released dyestuff will be carried by the fluid flow towards the cylinder which absorbs the dyestuff and becomes discolored thereby. This change of color is readily observed through the transparent housing.

As previously stated, the adsorbent filter medium is preferably activated carbon granules or chips, but may be silica gel or a molecular sieve. The oil-soluble dye capsules may consist of a mixture of oil-soluble wax and a dyestuff. Alternatively the dyestuff may be encapsulated within a shell of oil-soluble wax. The dyestuff is preferably red in color while the cylinder 14 is preferably white.

It is to be noted that the dye capsules may be any color which will contrast with that of the cylinder. Dye capsules available under the trademark of Imperial Chemical Industries Limited such as Waxoline Green, Waxoline Blue, Waxoline Yellow, or Waxoline Brown may be used instead of Waxoline Red, as described above. Furthermore, the cylinder 14 need not be white. The above-described cylinder is white because the fibres from which it is formed are white and the resin bonding agent is transparent. The fibres are preferably white but a colored bonding resin may be employed to give the cylinder a pastel shade. The resin bonding agent may be brown, in which case the cylinder is light brown, and the dye capsules employed may be red, or any of the colors indicated above. The brown dye is darker than the cylinder but preferably one of the other colors is used with a light brown cylinder.

Instead of using the above filter by itself, it is possible to use it also in combination with a main coalescing filter with which it is coupled in series. Such a combination is preferable in certain applications where sufficient oil is present during normal usuage to affect the dye capsules.

What is claimed is:

1. In a filter device for fluids, a filter cartridge comprising a housing means having opposed end regions and being formed with a fluid inlet at one of said end regions and a fluid outlet spaced from said inlet and situated at the other of said end regions, a micro-fibre cylinder means supported within said housing means for separating said fluid outlet from said fluid inlet, said cylinder means having a hollow interior communicating with said inlet, and said housing means having a side wall spaced from and surrounding an exterior side surface of said cylinder means to define therewith a passage through which fluid flows after passing from said inlet to the interior of said cylinder means and through the wall thereof to said passage before reaching said fluid outlet, said housing means coacting with said cylinder means for rendering the latter visible through said housing means, an adsorbent filter medium packed within the cylinder means, diffuser means disposed between said fluid inlet and the adsorbent medium for distributing fluid entering through said fluid inlet to said filter medium packed within said cylinder means, and oil-soluble dye means distributed within the adsorbent medium for responding to the presence of oil in fluid which enters through said inlet to release a dye having a color contrasting with that of said cylinder means and carried with the fluid through said cylinder means before reaching said passage, said cylinder means coacting with the dye released by said dye means when oil is present in the fluid to be discolored by said dye so that when the discolored cylinder is seen through said housing means it is known that oil is present in the fluid.

2. A filter cartridge according to claim 1, wherein said inlet is provided in an end wall of said housing means situated at said one end region thereof.

3. A filter cartridge according to claim 2, wherein said housing means is transparent for rendering said cylinder means visible through said housing means and said outlet is provided in said side wall of the housing means.

4. A filter cartridge according to claim 1, wherein the cylinder means consists of a reinforced borosilicate micro-fibre tube.

5. A filter cartridge according to claim 1, wherein the cylinder means extends between opposed end walls of the housing.

6. A filter cartridge according to claim 1, wherein the adsorbent filter medium consists of granules or chips of material selected from the group comprising activated carbon, activated alumina, silica gel and molecular sieve.

7. A filter cartridge according to claim 1, wherein the oil-soluble dye means includes capsules in the form of chips or granules consisting of a mixture of oil-soluble wax and a dyestuff.

8. A filter cartridge according to claim 1, wherein the oil-soluble dye means includes capsules which consist of a dyestuff encapsulated within a shell of oil-soluble wax.

9. A filter cartridge according to claim 1, wherein the oil-soluble dye means includes capsules of a color contrasting with that of the cylinder means.

10. A filter cartridge according to claim 9, wherein the cylinder means is white and the oil-soluble dye capsules are red.

11. A filter cartridge according to claim 1, wherein the diffuser means is formed of polyurethane.

12. A filter cartridge according to claim 1 and wherein said oil-soluble dye means is situated adjacent said diffuser means.

13. A filter cartridge according to claim 1, wherein said housing means has at said one end region thereof an end wall formed with apertures passing therethrough to provide said fluid inlet.

14. A filter cartridge according to claim 1, wherein said housing means is opaque and is provided with at least one transparent window through which said cylinder means is visible.

15. A filter cartridge according to claim 14, wherein said window is situated adjacent said one end region of said housing means relatively close to said adsorbent medium and the oil-soluble dye means distributed therein.

* * * * *